2,970,123
ISOCYANATE MODIFIED ALKYDS STABILIZED WITH AN ALIPHATIC ALCOHOL

Michael S. Rhodes, New York, and Richard G. Spaunburgh, East Aurora, N.Y., assignors to Allied Chemical Corporation, a corporation of New York No Drawing. Filed Jan. 23, 1957, Ser. No. 635,612

8 Claims. (Cl. 260—22)

This invention relates to isocyanate modified alkyd resins and more particularly refers to an isocyanate treated oil-modified alkyd resin stabilized to prevent gelation for long periods during storage.

An object of the present invention is to provide a method of preventing the gelation of organic solvent solutions of the reaction products obtained from the treatment of oil modified alkyd resins with organic polyisocyanates. The invention is applicable to any organic polyisocyanate reacted oil-modified alkyd resin which normally tends to gell on storage.

The improvement in general film properties of alkyd resins by modification of the alkyd with organic polyisocyanates has been long known in the art (U.S. Patent 2,282,827). The decrease in drying time of these isocyanate modified alkyd resin films is so great that in the case of the oil modified alkyd resins, depending on the amount of polyisocyanate used and the type of oil present, gelation of the solution often occurs before a film can be laid down; even if self-polymerization of the isocyanate treated alkyd resin is slower, the compositions will gel sufficiently rapidly that storage is almost an impossibility. In most cases the best shelf life time to be expected is of the order of a few days.

We have found that these difficulties can be overcome by the use of a small amount of compound, as a gelation inhibitor, that does not interfere with the good drying properties and other desirable features of the film of isocyanate modified alkyd resin. The type of compound suitable as a gelation inhibitor or viscosity stabilizer is an aliphatic alcohol free from reactive hydrogen atoms other than those of hydroxyl group.

In a preferred embodiment of the invention, a small amount of a diisocyanate is added, with mixing, to a substantially anhydrous solution of the oil modified alkyd resin in an organic solvent. The solvent should be one that is unreactive with the isocyanate group. The mixing may or may not be accompanied by heating, depending upon the type of oil modifying the resin and the composition of the resin itself. The treatment with the polyisocyanate is usually accompanied or followed by auxiliary treatment with a small amount of a metallic drier, such as cobalt or lead naphthenate. After the reaction of the alkyd resin with the polyisocyanate, the gel inhibitor, an alcohol such as n-butanol, is added with mixing. The mixing of the isocyanate modified alkyd resin with the gel inhibitor may or may not be accompanied by the application of heat. The resultant mixture in an organic solvent can be stored in an essentially anhydrous condition for a period of months, usually more than six months, without gelation occurring.

The films or coatings obtained from solutions of alkyd resins treated in the above manner have in no measure lost any of the characteristic properties of films produced from solutions of the alkyd resins as modified with polyisocyanate according to the procedure set forth in U.S. Patent 2,282,827.

According to the present invention, the beneficial effects of the incorporation of an aliphatic alcohol can be obtained to some extent with any kind of oil modified alkyd resin, which on reaction with polyisocyanate tends to increase markedly in viscosity under normal conditions. Suitable alkyd resins are obtainable from such polycarboxylic acids as phthalic, isophthalic, terephthalic, succinic, adipic, maleic, fumaric, malic, citric, camphoric, diphenic acids or anhydrides thereof; and from such polyhydric alcohols as ethylene glycol, hexamethylene glycol, pinacol, glycerol, trimethylolpropane, hexanetriol, erythritol, pentaerythritol and mannitol. These alkyd resins are modified in known manner with drying, semi-drying or non-drying oils such as linseed, perilla, soyabean, tung (Chinese wood), corn, cottonseed, croton, castor, olive, coconut oils, or oil acids thereof. Suitable resins can be made from various mixtures of these ingredients, which can be combined by any of the above methods known to the art. To be suitable and useful for the preparation of films and coating compositions, the alkyd resin should be soluble in an organic solvent. To produce the isocyanate reacted oil modified alkyd resin coating compositions which are treated with the novel gelation inhibitors of the present invention, the oil modified alkyd resins are reacted in known manner with any of many polyisocyanates, such as hexamethylene diisocyanate, cyclohexyl-1,4-diisocyanate, toluylene diisocyanates, diphenyl methane-4,4'-diisocyanate, biphenyl-4,4'-diisocyanate and naphthalene diisocyanates and others. The resins thus obtained are dissolved in suitable organic solvents or mixtures of solvents, e.g. toluene, xylene, ethyl acetate, mineral spirits, etc. to produce coating compositions, as is well known. The aliphatic alcohols suitable for use as gelation inhibitors for these isocyanate treated oil modified alkyd resin coating compositions may contain one to twenty or more carbon atoms but must contain no active hydrogen atoms other than those present in hydroxyl group. The alcohols may contain substituents devoid of active hydrogen atoms, e.g. chlorine, bromine, alkoxy, nitro, and the carbon chain may be interrupted by —O—, —S—, —COO—, etc. Suitable alcohols include saturated alcohols, e.g. ethyl, propyl, butyl, amyl and higher homologues such as dodecyl; unsaturated alcohols, e.g. allyl alcohol, methyl vinyl carbinol, allyl carbinol, propynol and other ethynylcarbinols; substituted alcohols include ethylenechlorhydrin, 2 - methoxyethanol, 2($\beta$ - hydroxyethoxy) ethanol, etc. The preferred alcohols are the saturated aliphatic monohydric alcohols, especially those containing 1–10 carbon atoms in the chain, in particular n-butanol, since they provide a more effecitve, long-lasting viscosity stabilization. To obtain the benefit of an aliphatic alcohol as a gelation inhibitor, it is important to add the aliphatic alcohol after the reaction of the alkyd resin with the polyisocyanate.

The amount of organic polyisocyanate used to obtain the maximum benefit in improved adhesion, drying time, hardness and tensile strength of the reaction product when treating the oil modified alkyd resins, can be varied within a considerable range. While in general oil modified alkyd resins will have improved drying and film properties by reaction thereof with 1–25% by weight of polyisocyanate, which amount is dependent on several factors such as the hydroxyl number and degree of resinification of the alkyd resin as well as the type of oil used to modify the resin; the drying oil modified alkyd resins benefit from amounts of the order of 1–5% polyisocyanate. For the drying oil modified alkyd resins, using a polyisocyanate such as tolylene diisocyanate, the preferred amount is about 2% based on the alkyd resin solids. The reaction product can be obtained by carrying out the treatment at a temperature range from 20° to 100° C. The time of reaction is dependent on several factors such as the temperature, the type of oil modifying the alkyd resin and the particular alkyd. The gelation of the isocyanate treated oil modified alkyd resins can be approximately correlated with the iodine number of the oil, so that with the drying oil modified alkyd resins the use of even the smaller amounts of polyisocyanate results in a marked tendency to rapid gel formation.

The amount of alcohol used as the gel inhibitor or viscosity stabilizer according to the present invention, can be varied over a wide range, the minimum amount being that which will react with sufficient of the free NCO groups to prevent appreciable gelation of the alkyd resin solution. The maximum amount that can be used is dependent on the compatibility of the alkyd resin solution with the alcohol, and no useful purpose is obtained by having such an excess of alcohol present that it acts as a solvent for the modified alkyd resin. In practice we have found 0.5–2.0% by weight alcohol based on the alkyd resin satisfactorily prevented gelation.

The temperature of the alcohol incorporation is not critical but generally it is preferable to carry out the treatment at room temperature since there is a tendency for the composition to darken if appreciable heat is used; that is, the alcohol treatment, preferably should be carried out at temperatures below 100° C.

It is believed that the gelation of the isocyanate treated oil modified alkyd resins is due to the cross-linking action of the free NCO groups with the reactive hydrogen atoms of the urethane groups, which are formed in the initial reaction of the isocyanate with the alkyd resin OH groups. If the alcohol gel inhibitors of the present invention merely act as a means of "masking" the reactive NCO groups, then it would be expected that any type of compound containing reactive hydrogen atoms could be used. However, it has been found experimentally that such is not the case; compounds such as aliphatic amines, aniline, urea, acetic acid or phenol do not act as viscosity stabilizers when used in similar manner to the alcohols. Though the course of the gel inhibition reaction is not clearly understood, it would appear that alcohols, of the class defined above, are the only type of compounds which produce the desired viscosity stabilizing.

The more detailed practice of the invention is illustrated by the following examples, in which parts given are by weight.

*Example 1*

100 parts of standard commercial alkyd resin (Barrett Division "Plaskon" resin #3177; 23% phthalic anhydride, 65% soyabean oil) were dissolved in 100 parts of xylene. The solution heated to 70° C. for 1 hour with 1.4 parts of toluylene diisocyanate (20%, 2,6-isomer, 80% 2,4-isomer mixture known as "Nacconate" 80). 1.2 parts of n-butanol were added and the mixture was maintained at 60–70° C. for fifteen minutes, and allowed to cool to room temperature.

The above treated diisocyanate modified alkyd resin solution was stored in an airtight container for a period of more than eight months without gelation, whereas the same diisocyanate modified alkyd resin solution prepared without n-butanol gelled (formed a solid jelly-like mass) within forty-eight hours.

*Example 2*

100 parts of the commercial alkyd resin used in Example 1 were reduced to 50% solids with xylene. To this solution 1.4 parts toluylene diisocyanate ("Nacconate" 80) were added and the mixture was allowed to react at room temperature for sixteen hours. To the resulting solution of diisocyanate modified alkyd resin, 1.2 parts sec-butanol were added with thorough mixing.

The diisocyanate treated oil modified alkyd resin solution thus obtained showed no gelation on storage for about six months, whereas the solution similarly prepared without the butanol addition gelled in about two days.

*Example 3*

100 parts of a commercial alkyd resin (Barrett Division "Plaskon" resin #3150, 30% phthalic anhydride, 46% soyabean oil) were treated as in Example 2 but with tertiary butanol. The resultant alkyd resin solution remained fluid under normal storage conditions for over two months, and gave fast drying films of good physical properties. The same diisocyanate modified alkyd resin solution prepared without the addition of tertiary butanol gelled within two days' storage.

*Example 4*

A commercial alkyd resin (Barrett Division "Plaskon" resin #3185, 35% phthalic anhydride, 50% soyabean oil) was modified with diisocyanate as in Example 2 and then treated with tertiary-amyl alcohol before storage. The alkyd resin solution remained fluid on storage for eight months, whereas the solution prepared in identical manner but without the tertiary-amyl alcohol gelled within forty-eight hours.

*Example 5*

The procedure of Example 2 was repeated using the following materials: 100 parts of a 50% xylene solution of a 63% soyabean oil modified alkyd resin ("Plaskon" resin #3178), 1.4 parts of toluylene diisocyanate ("Nacconate" 80), and 0.8 part ethyl alcohol. The resulting coating composition possessed good shelf life, whereas the same solution prepared without the addition of ethyl alcohol gelled within forty-eight hours.

*Example 6*

The procedure of Example 2 was repeated except that 2.1 parts of n-octyl alcohol were added in place of butanol to the diisocyanate treated oil modified alkyd resin solution. The solution thus obtained showed no gelation on storage for about eight months.

*Example 7*

A commercial alkyd resin (McDougall-Butler #G–1143 phthalic anhydride, pentaerythritol, glycerol treated with soyabean oil) was modified with diisocyanate according to the procedure of Example 2 and treated with 1.1 parts isopropyl alcohol before storage. The alkyd resin solution thus obtained did not gel after six months or more storage under normal conditions, whereas the alkyd resin solution prepared in the same manner but without isopropyl alcohol gelled within 2 days.

*Example 8*

A non-drying oil modified alkyd resin (Barrett Division "Plaskon" resin #3115, 48% castor oil) was reacted with diisocyanate and treated with n-butanol according to the procedure of Example 2. The addition of the n-butanol prevented gel formation, which in the untreated sample occurs within two weeks.

Although certain preferred embodiments of the invention have been disclosed for purpose of illustration, it will be evident that various changes and modifications may be made therein without departing from the scope and spirit of the invention.

We claim:
1. A method of preventing gelation during storage of an isocyanate treated oil-modified alkyd resin composition comprising the reaction product consisting essentially of an oil-modified alkyd resin wherein said oil is selected from the group consisting of linseed, perilla, soyabean, tung, corn, cottonseed, croton, castor, olive, coconut oils, or oil acids thereof, with 1–25% by weight of said oil-modified alkyd resin of an organic polyisocyanate wherein the isocyanate groups are the sole reacting groups, dissolved in an inert liquid solvent which comprises admixing with said solution of inert liquid solvent containing said reaction product as a gelation inhibitor 0.5–2% by weight of the oil-modified alkyd resin of an unsubstituted saturated aliphatic alcohol containing 1–10 carbon atoms.

2. A method of preventing gelation during storage of an isocyanate treated oil-modified alkyd resin composition comprising the reaction product consisting essentially of an oil-modified alkyd resin wherein said oil is selected from the group consisting of linseed, perilla, soyabean, tung, corn, cottonseed, croton, castor, olive, coconut oils, or oil acids thereof, with 1–25% by weight of said oil-modified alkyd resin of an organic polyisocyanate wherein the isocyanate groups are the sole reacting groups, dissolved in an inert liquid solvent which comprises admixing with said solution of inert liquid solvent containing said reaction product as a gelation inhibitor 0.5–2% by weight of the oil-modified alkyd resin of n-butanol.

3. A method of preventing gelation during storage of an isocyanate treated oil-modified alkyd resin composition comprising the reaction product consisting essentially of an oil-modified alkyd resin wherein said oil is selected from the group consisting of linseed, perilla, soyabean, tung, corn, cottonseed, croton, castor, olive, coconut oils, or oil acids thereof, with 1–25% by weight of said oil-modified alkyd resin of an organic polyisocyanate wherein the isocyanate groups are the sole reacting groups, dissolved in an inert liquid solvent which comprises admixing with said solution of inert liquid solvent containing said reaction product as a gelation inhibitor 0.5–2% by weight of the oil-modified alkyd resin of propanol.

4. A method of preventing gelation during storage of an isocyanate treated oil-modified alkyd resin composition comprising the reaction product consisting essentially of an oil-modified alkyd resin wherein said oil is selected from the group consisting of linseed, perilla, soyabean, tung, corn, cottonseed, croton, castor, olive, coconut oils, or oil acids thereof, with 1–25% by weight of said oil-modified alkyd resin of an organic polyisocyanate wherein the isocyanate groups are the sole reacting groups, dissolved in an inert liquid solvent which comprises admixing with said solution of inert liquid solvent containing said reaction product as a gelation inhibitor 0.5–2% by weight of the oil-modified alkyd resin of ethanol.

5. An isocyanate treated oil-modified alkyd resin stabilized to prevent gelation for long periods during storage comprising the reaction product consisting essentially of an oil-modified alkyd resin wherein said oil is selected from the group consisting of linseed, perilla, soyabean, tung, corn, cottonseed, croton, castor, olive, coconut oils, or oil acids thereof, with 1–25% by weight of said oil-modified alkyd resin of an organic polyisocyanate wherein the isocyanate groups are the sole reacting groups, dissolved in an inert liquid solvent to which solution of inert liquid solvent containing said reaction product is thereafter admixed as a gelation inhibitor 0.5–2% by weight of the oil-modified alkyd resin of an unsubstituted saturated aliphatic alcohol containing 1–10 carbon atoms.

6. An isocyanate treated oil-modified alkyd resin stabilized to prevent gelation for long periods during storage comprising the reaction product consisting essentially of an oil-modified alkyd resin wherein said oil is selected from the group consisting of linseed, perilla, soyabean, tung, corn, cottonseed, croton, castor, olive, coconut oils, or oil acids thereof, with 1–25% by weight of said oil-modified alkyd resin of an organic polyisocyanate wherein the isocyanate groups are the sole reacting groups, dissolved in an inert liquid solvent to which solution of inert liquid solvent containing said reaction product is thereafter admixed as a gelation inhibitor 0.5–2% by weight of the oil-modified alkyd resin of n-butanol.

7. An isocyanate treated oil-modified alkyd resin stabilized to prevent gelation for long periods during storage comprising the reaction product consisting essentially of an oil-modified alkyd resin wherein said oil is selected from the group consisting of linseed, perilla, soyabean, tung, corn, cottonseed, croton, castor, olive, coconut oils, or oil acids thereof, with 1–25% by weight of said oil-modified alkyd resin of an organic polyisocyanate wherein the isocyanate groups are the sole reacting groups, dissolved in an inert liquid solvent to which solution of inert liquid solvent containing said reaction product is thereafter admixed as a gelation inhibitor 0.5–2% by weight of the oil-modified alkyd resin of propanol.

8. An isocyanate treated oil-modified alkyd resin stabilized to prevent gelation for long periods during storage comprising the reaction product consisting essentially of an oil-modified alkyd resin wherein said oil is selected from the group consisting of linseed, perilla, soyabean, tung, corn, cottonseed, croton, castor, olive, coconut oils, or oil acids thereof, with 1–25% by weight of said oil-modified alkyd resin of an organic polyisocyanate wherein the isocyanate groups are the sole reacting groups, dissolved in an inert liquid solvent to which solution of inert liquid solvent containing said reaction product is thereafter admixed as a gelation inhibitor 0.5–2% by weight of the oil-modified alkyd resin of ethanol.

References Cited in the file of this patent

UNITED STATES PATENTS

| | | |
|---|---|---|
| 2,284,637 | Catlin | June 2, 1942 |
| 2,333,922 | Foster | Nov. 9, 1943 |
| 2,374,136 | Rothrock | Apr. 17, 1945 |
| 2,430,479 | Pratt et al. | Nov. 11, 1947 |
| 2,511,310 | Upson | June 13, 1950 |

FOREIGN PATENTS

| | | |
|---|---|---|
| 858,122 | Germany | Dec. 4, 1952 |
| 895,527 | Germany | Nov. 2, 1953 |

OTHER REFERENCES

Serial No. 397,741, Schlack (A.P.C.), published April 20, 1943.